(12) United States Patent
Outsen et al.

(10) Patent No.: US 6,199,997 B1
(45) Date of Patent: Mar. 13, 2001

(54) FLASHLIGHT WITH A SAFETY POINT AND METHOD OF PRODUCTION THEREOF

(76) Inventors: Arthur C. Outsen; Daniel C. Outsen, both of 151 Woodruff Pl., Arcadia, CA (US) 91007

( * ) Notice: Subject to any disclaimer, the term of this patent is extended or adjusted under 35 U.S.C. 154(b) by 0 days.

(21) Appl. No.: 09/294,256

(22) Filed: Apr. 19, 1999

(51) Int. Cl.⁷ .................................................. F21V 33/00
(52) U.S. Cl. .................... 362/109; 362/120; 362/202; 362/253; 362/208
(58) Field of Search .................... 362/109, 119, 362/120, 115, 118, 157, 196, 202, 253, 456, 102, 208

(56) References Cited

U.S. PATENT DOCUMENTS

| | | | |
|---|---|---|---|
| 4,751,621 | * | 6/1988 | Jenkins ................................. 362/119 |
| 4,882,956 | * | 11/1989 | Lang ......................................... 81/20 |
| 4,896,253 | * | 1/1990 | Southworth ........................... 362/109 |
| 4,985,954 | * | 1/1991 | Wehr ........................................ 7/144 |
| 5,097,599 | * | 3/1992 | Hasegawa ............................... 30/359 |
| 5,226,718 | * | 7/1993 | Lin ........................................ 362/119 |
| 5,491,898 | * | 2/1996 | Riley ...................................... 30/366 |
| 5,611,615 | * | 3/1997 | Jang .................................... 362/119 |
| 5,657,543 | * | 8/1997 | Collins .................................. 30/367 |
| 6,036,332 | * | 3/2000 | Antal ................................... 362/119 |

* cited by examiner

Primary Examiner—Sandra O'Shea
Assistant Examiner—John Anthony Ward
(74) Attorney, Agent, or Firm—Christie, Parker & Hale, LLP

(57) ABSTRACT

A flashlight has a safety point that can break a glass window in an emergency. The flashlight comprises a handle, a lamp at the first end of a handle, an end cap at the second end of a handle, and a safety point base coupled to the end cap. The safety point base includes an intermediate support cylinder, an enlarged end plate, a central cylinder, and a central peg. There is a central bore, which is throughout the intermediate support cylinder, the enlarged end plate, and the central cylinder, the central peg being received into the central bore. The central peg has a cylindrical portion and a safety point tip portion which protrudes from the enlarged end plate.

28 Claims, 5 Drawing Sheets

FLASHLIGHT WITH A SAFETY POINT AND
METHOD OF PRODUCTION THEREOF

FIELD OF THE INVENTION

The present invention relates to flashlights and, more particularly, to a safety point provided on an end cap of a flashlight which is used to break glass in an emergency.

BACKGROUND OF THE INVENTION

Fire fighters, law enforcement personnel and other emergency services personnel often encounter an emergency situation where it becomes necessary to break a pane of tempered glass such as in an automobile window or home. Using the typical implements that they carry, such as batons and flashlights, it can be very difficult to break the glass.

Design trends have provided automobiles with additional glass windows and other glass areas. Buildings have also been constructed with large glass windows and partitions. With so many power accessories and safety, comfort and security subsystems in a vehicle or in a building, these glass panes are often closed and may not even be capable of being opened. Thus, in an emergency, the ability of occupants to escape through a window is often prevented. In a vehicle, for example, with the air conditioning running, the windows are closed. Many vehicles have power lock doors, windows, self-locking doors, and childproof door latches. These security/safety subsystems are controlled at the drivers seat by the driver. There is no electrical override. In an emergency, the driver must release these subsystems to allow passengers to exit the vehicle.

In an accident, including one in which a vehicle remains upright, an electrical failure, fire or electrical short in a subsystem may preclude the ability to rapidly exit the vehicle. If doors are locked, jammed or inoperable, the only means of escape is through a window. If the vehicle is flipped over or is submerged in water, exit is prevented unless the windows are broken. Yet, safety glass in vehicles is difficult to break by kicking or punching. As a result, there is no ability to exit rapidly from smoke, fire, water or fumes that are entering the passenger compartment.

Attempts to successfully break a window manually as by a kick, elbow, punch, or slam is difficult because the window glass has flexibility and absorbs some of the energy of the blows. Repeated unsuccessful attempts to break out increase fear and anxiety from the inability to escape.

In buildings, large, thick, plate glass windows are even more difficult to break than vehicle glass. It is known that attempts to escape from a building may involve smashing a chair or other heavy object against a window pane only to have the pane remain unfazed, or crack but not break open.

Safety hammers are known that have a point or points that can be used to break glass. However, these hammers are specially designed for breaking glass or for emergency use and therefore may not be on hand or readily accessible when the need arises. They are not typical implements that are carried or readily accessible day after day, nor are they designed or configured to be incorporated or retrofitted into such typical implements. Moreover, these safety hammers normally have exposed points that can cause inadvertent injury.

Accordingly, an easy to carry, easy to use and readily accessible means is needed for emergency services personnel to break in through a window in various emergencies and for occupants to break out through a window in various emergencies. It would be particularly desirable if such means could be incorporated or retrofitted into an implement that is already in widespread use.

SUMMARY OF THE INVENTION

The present invention is a flashlight which has a safety point that can break a glass window in an emergency. A safety point base is provided on an end cap for a flashlight. The safety point base includes an intermediate support cylinder, an enlarged end plate, a central cylinder, and a central peg. There is a central bore throughout the intermediate support cylinder, the enlarged end plate, and the central cylinder, the central peg being received into the central bore. The central peg has a cylindrical portion and a safety point tip portion which protrudes from the enlarged end plate.

The end caps of existing flashlights can be retrofitted or adapted to be used with the safety point base, such that new flashlights will not need to be manufactured or purchased. Alternatively, the end cap may comprise the safety point base integrally as part of a new flashlight. The safety point tip portion is preferably bonded or press fit into the central bore, but also may be integral with the safety point base. If the tip portion is press fit into the central bore, it is more easily removed and replaced when worn. A rubber cap is placed over the safety point tip portion to avoid inadvertent contact with the tip by a user and any injury caused by such contact. A slit in the rubber cap allows the tip portion to pierce the rubber cap and be utilized to break windows. The rubber cap returns to the original shape over the tip portion after use so as to continue to avoid harm to persons using the flashlight.

BRIEF DESCRIPTION OF THE DRAWINGS

These and other features and advantages of the present invention will become appreciated as the same becomes better understood with reference to the specification, claims and drawings, wherein

DETAILED DESCRIPTION OF THE PREFERRED EMBODIMENT

Figure 1:
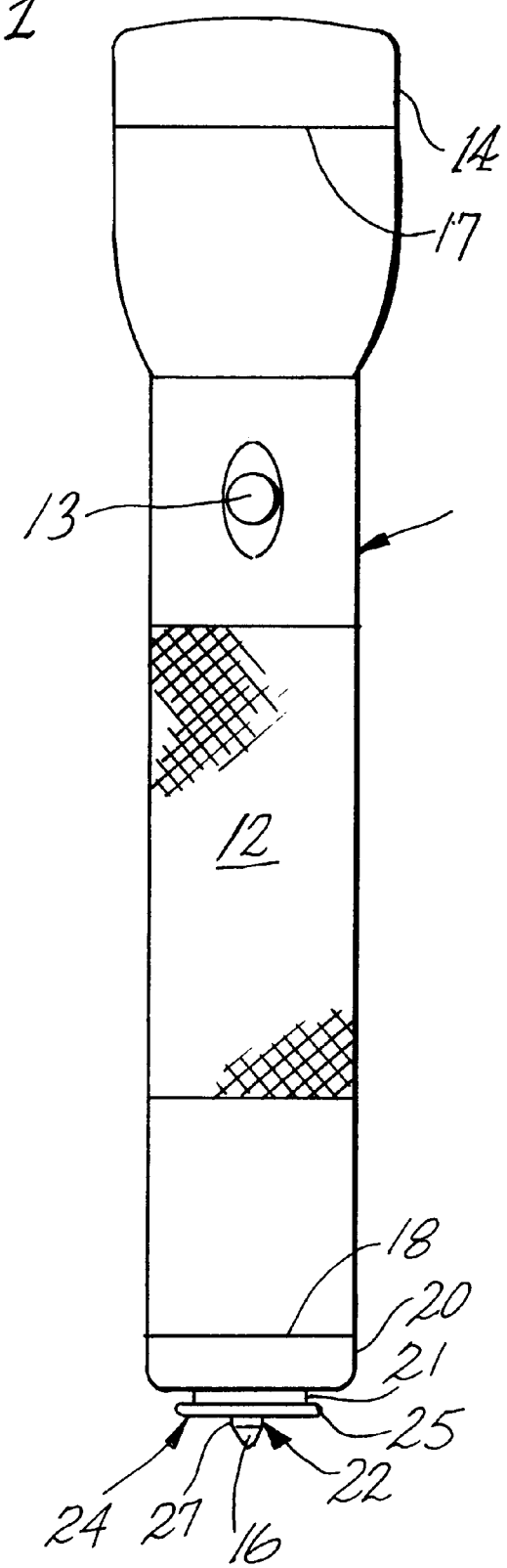
FIG. 1 is a plan side view of a flashlight of the present invention.
Figure 2:
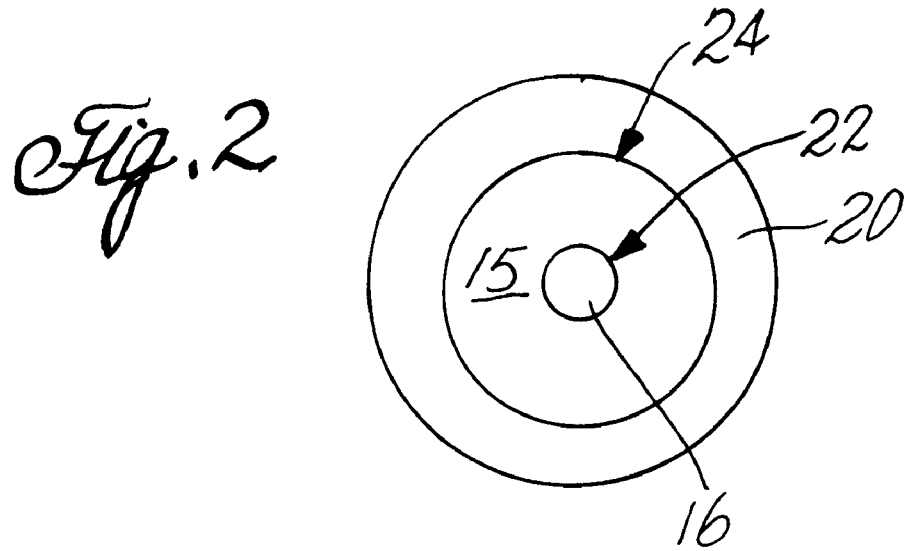
FIG. 2 is an end view of the flashlight of the present invention.
Figure 3:
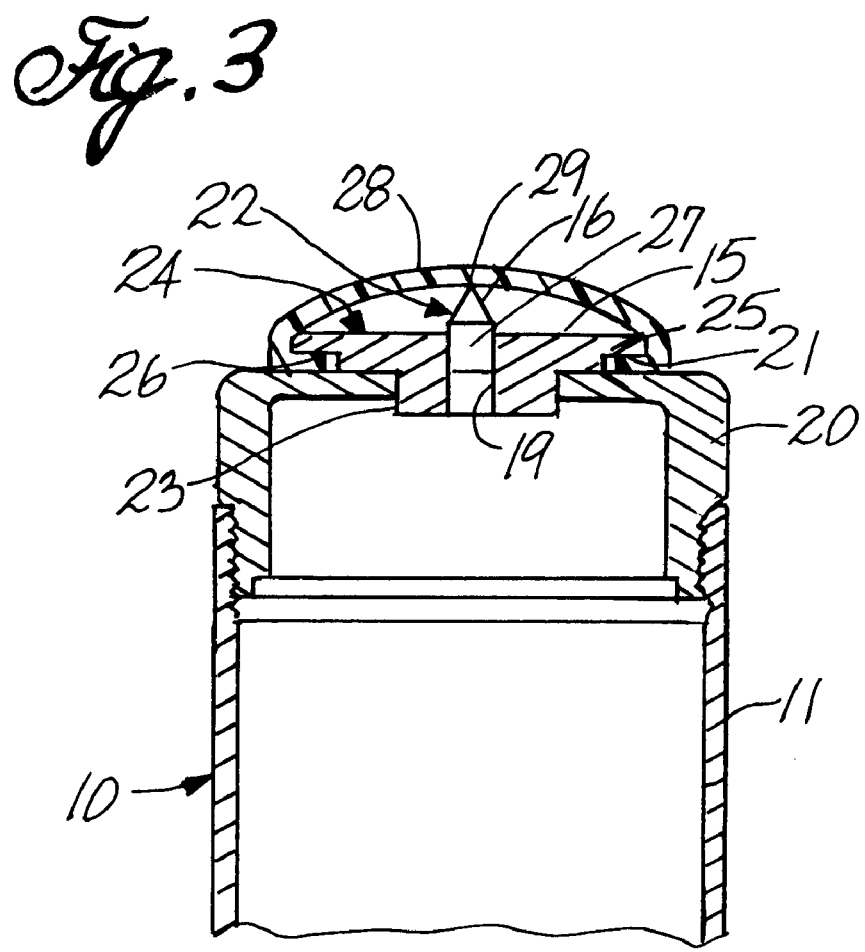
FIG. 3 is a cross-sectional side view of the second or tail end of the flashlight of the present invention.

Referring now to the figures, and in particular, FIGS. 1 through 3, a flashlight 10 according to the present invention is illustrated. In one preferred embodiment, the flashlight 10 comprises a handle 11, a lamp 14 and an end cap 20. The handle has a first end 17 and a second end 18. The lamp attaches to the first end of the handle whereas the end cap attaches to the second end of the handle. The end cap screws into the handle of the flashlight.

The flashlight has a grip 12 located around the circumference of the handle in the middle part of the handle, and a switch 13 for turning the lamp of the flashlight on and off. The batteries (not shown) that power the flashlight are contained inside the handle and can be inserted or removed and replaced by screwing off the end cap. Thus, other than the end cap, which is modified as described in greater detail below, the flashlight is intended to be and can be any of a number of commercially available flashlights that are in widespread use.

The particular flashlight depicted, other than the end cap, is one available from Mag Lite of Ontario, Calif. a flashlight that is in widespread use and often carried by law enforcement and other emergency services personnel. However, the present invention could be adopted by modifying the end caps of flashlights made by other manufacturers, such as Streamlight, Inc. of Norristown, Pa. or even by developing a new flashlight to carry a specially designed end cap.

A safety point base 24 extends out from end cap 20. In this embodiment, the safety point base is a separate piece that attaches to the end cap, and a central peg 22 of the safety point base is not integral therewith. The benefit of this embodiment is that the original end cap of the flashlight can be retrofitted to accommodate the safety point base thereon. This saves money in materials and provides a use for the original end caps, rather than disposal. The separate central peg can be removed when its tip is worn due to repeated use. Alternatively, the central peg can be integral with the intermediate support cylinder, the enlarged end plate, and the central cylinder of the safety point base, so that the safety point base can be installed and removed as one piece.

The safety point base comprises an intermediate support cylinder 21, an enlarged end plate 25, and a central cylinder 23. The intermediate support cylinder, the enlarged end plate, and the central cylinder each have a central bore 19 that extends down through the safety point base. The central peg 22 is received in the central bore of the safety point base and has a cylindrical portion 27 and a safety point tip portion 16. The safety point tip portion protrudes from the enlarged end plate in a direction away from the flashlight and has a cone shape. The cone has a bottom diameter that corresponds to and is integrally coupled with the diameter of one of the ends of the cylindrical portion.

The angle formed by the cone sidewall from its base to the top of the tip portion is approximately 45°. The length of the tip portion from the top of the cone to the bottom of the cylindrical portion is approximately ½ inch. The diameter of the cylindrical portion is approximately 0.250 inch. The enlarged end plate has a diameter of approximately 1 inch. This area of the safety point base protects the end cap from damage by absorbing impacts and spreading out the force through the intermediate support cylinder upon impact with the glass. The enlarged end plate does not extend beyond the diameter of the end cap so it will not catch on things or prevent the flashlight from being placed in a recharger for charging of the batteries in the flashlight.

In this embodiment, the safety point base is preferably comprised of 4140 tool steel that is heat treated and quenched. However, the safety point base can be made from aluminum or stainless steel as well. Preferably, the central peg is made of plasma cut tungsten carbide, and has a ground in point. However, the central peg can be made of any resilient material that is strong enough to break glass. The central peg is intended to be capable of reuse for multiple instances where a glass pane must be broken.

Using plasma cut tungsten carbide for the safety point provides the most uses of the safety point to break glass, i.e., the longest useful life for the tip, as the strength of the material will allow the tip portion to maintain its shape. Central pegs made from stainless steel or aluminum are less expensive to replace than tungsten carbide, but will need to be replaced more often. Any material that holds a point and that is sufficiently strong enough to break glass can be used for the tip portion.

The central cylinder, the intermediate support cylinder, and the enlarged end plate are coupled, preferably integral with one another, and centrally aligned around the central bore. The enlarged end plate is centrally placed upon the intermediate support member which is centrally placed upon the central cylinder. The enlarged end plate has a larger diameter than the intermediate support member which has a larger diameter than the central cylinder. The enlarged end plate has a face surface 15 and an undercut or lip 26. The lip is provided along the surface of the enlarged end plate that does not overlap with the surface of the intermediate support cylinder. The central cylinder is received in a hole on the end of the end cap. The intermediate support cylinder and the enlarged end plate protrude out from the end cap.

The central bore has a diameter of approximately 0.246. Preferably, the diameter of the central bore is slightly smaller than the diameter of the cylindrical portion. This difference in diameter leads to a tight friction fit of the central peg into the central bore, such that the central peg will not come out of the receiving end plate and face plate unintentionally.

As the tip portion is sharp, a protective cover is desirable to protect the user or other objects from inadvertent contact with the tip portion. The protective cover is coupled to the face plate of the safety point base. Preferably, the protective cover is a neoprene or rubber cap 28. The lip of the enlarged end plate allows the edges of cap to wrap around the enlarged end plate at the underside thereof to secure the cap. The edges of the cap can be held in place by the elastic force of the neoprene or rubber, or the cap can be glued with epoxy or silicone adhesive to the lip to prevent inadvertent removal of the cap. Alternatively, the cap can be placed over the tip portion and under the enlarged end plate first before inserting the safety point base into the end of the end cap. The edges of the cap would then be caught between the end cap and the enlarged end plate upon installation of the base on the end cap, and would be held in place by the pressure placed upon the connection between the end cap and the safety point base.

The cap is preferably made from any resilient material with the ability to be pierced by the tip portion and have a property such that it will return substantially to its original shape and continue to provide protection from inadvertent contact throughout multiple uses. The cap can be the same material as that used for the flashlight switch, and the same color.

In order to use the tip portion to break glass, the user moves the second end of the flashlight substantially squarely into the glass. The tip will pierce the cap and impact the glass, causing it to shatter. However, there can be a slit 29 in the cap from which the tip portion protrudes during use. Alternatively, the cap can be removed and replaced after each use.

Figure 4:
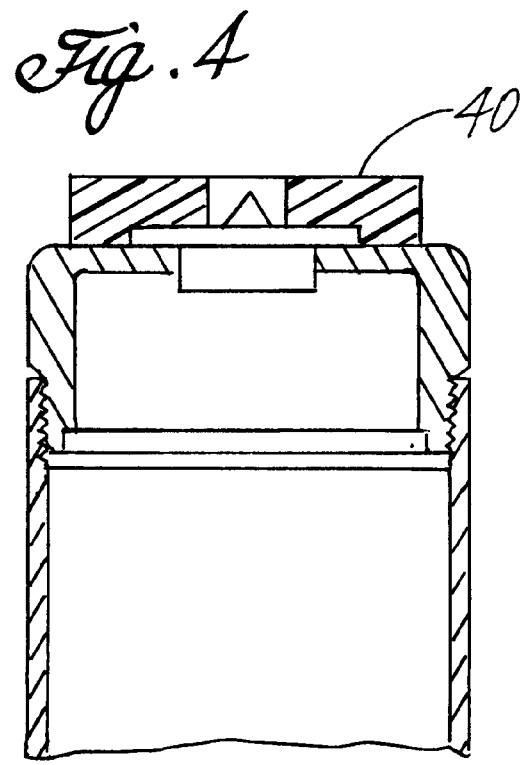
FIG. 4 is a cross-sectional side view of the second end of an alternate embodiment of the flashlight of the present invention.

In an alternative embodiment, the protective cover is a rubbery doughnut 40 as shown in FIG. 4. The doughnut is coupled with the face plate of the knob end and surrounds the tip portion. The doughnut is at least as high as the length of the safety point tip portion, so that the user is protected from inadvertent contact with the safety point tip portion when the doughnut is in place. The doughnut is made of a deformable material. During use of the tip portion of the safety point base, the rubbery doughnut flattens, allowing the tip portion to penetrate the glass, thereby breaking the glass.

A CNC lathe is used to manufacture the safety point base from the base metal. The lathe uses a drill bore to manufacture the central bore of the safety point base.

A hole is drilled in the end cap, such that the central cylinder is received into the hole in the end cap. Through an arbor press the central peg is placed into the safety point base and the safety point base is then pressed into the end cap. This press fit is preferably watertight. The central peg can be replaced by removing the central peg by using the arbor press and replacing with another similar central peg. The central peg can also be inserted into the central bore in the safety point base and held there by epoxy or welding of the two, with or without a press fit also being used.

The advantage of using glue or epoxy to secure the central peg is that the central peg will adhere better to the central bore. However, using the press fit method of securing the central peg alone allows for easier replacement.

Figure 5A:
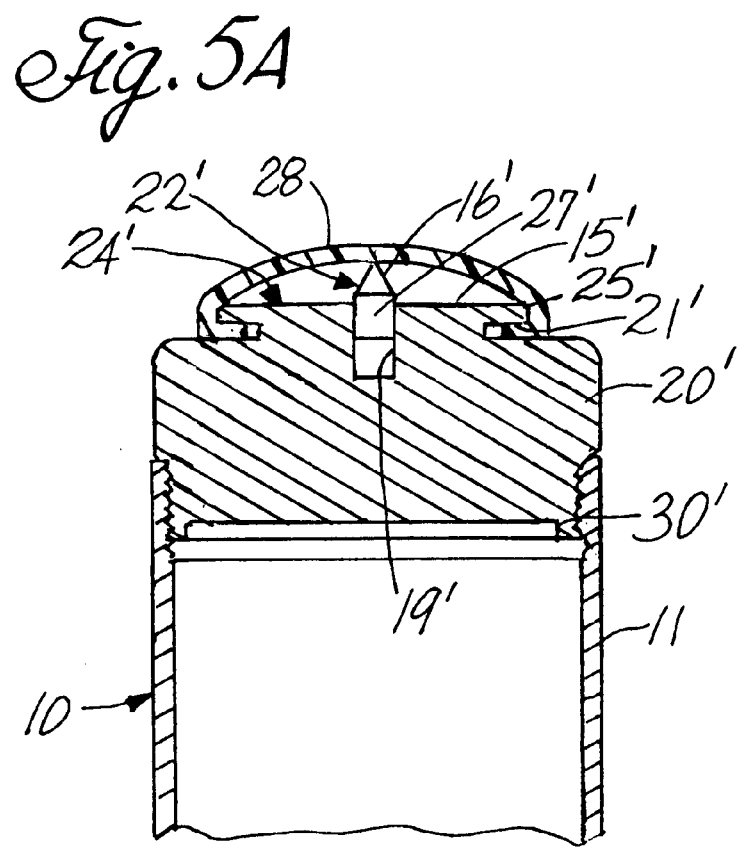
FIGS. 5A and 5B are cross-sectional side views of the second end of another alternate embodiment of the flashlight of the present invention.
Figure 5B:
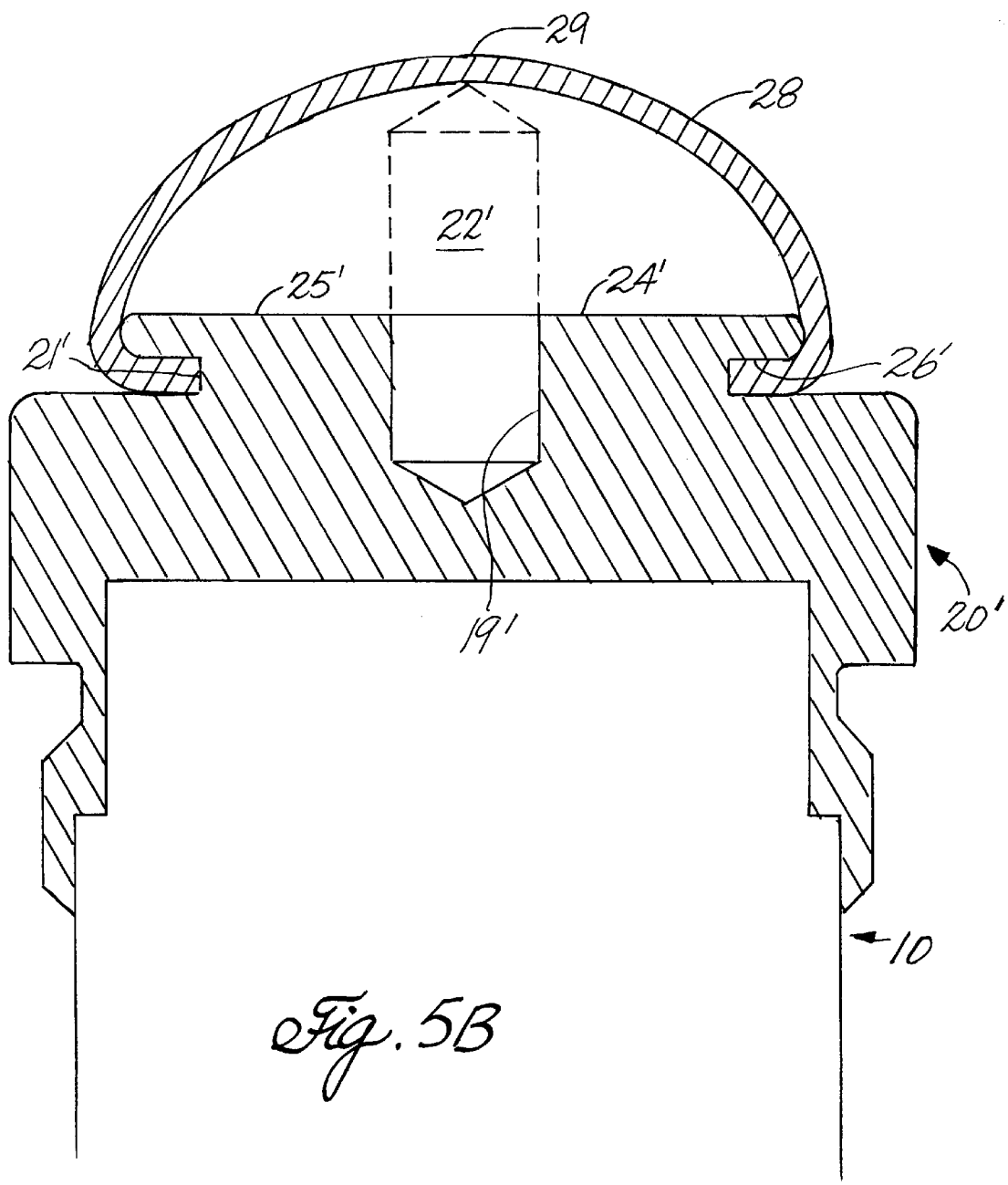

FIGS. 5A and 5B disclose a side view of other alternate and exemplary embodiments of flashlight 10 of the present invention. These embodiments are substantially the same as the above embodiment, except an end cap 20' of the flashlight is integral with a safety point base 24'. In this embodiment, the end cap comprises the safety point base which has an enlarged end plate 25', an intermediate support cylinder 21', and threads 30' for screwing the end cap onto the second end of the flashlight. The enlarged end plate has a face surface 15' and a lip 26'. A cap 28 is placed over the lip and held in place by the elastic nature of the cap and/or use of an adhesive.

The enlarged end plate and the intermediate support cylinder have a corresponding central bore 19' which extends further into the end cap than the depth of the enlarged end plate plus the intermediate support cylinder. The safety point base is integral with the end cap, but a central peg 22' of the safety point base is removable and replaceable from the central bore. The central peg has a cylindrical portion 27' and a safety point tip portion 16' which extends past the enlarged end plate. The benefits of this embodiment are that the original end cap of the flashlight is completely replaceable with this embodiment, and the central peg can be individually replaced when needed. A presently preferred embodiment is shown in FIG. 5B where the underside of the end cap has been partially bored out. This requires an additional manufacturing step but reduces the amount of material used in the end cap and the weight of the end cap.

The integral end cap is comprised of aluminum, the material typically used for the remainder of the flashlight. However, the end cap could be made of other materials such as tool steel either for cost reduction or to match with alternate flashlight materials. The central peg can be press fit and/or glued in place in the central bore of the safety point base. Glues that can be used include epoxy, jb weld, and loctite. A rubber cap can be placed over the tip portion of the central peg for protection similarly to the above embodiments.

Preferably, the end cap diameter is approximately 1.5", the diameter of the enlarged end plate is approximately 1.125", and the diameter of the intermediate support cylinder is approximately 0.875". The edges of the end cap and the safety point base are rounded. The bottom of the central bore is cone shaped with a drill point at approximately a 29° angle.

Figure 6:
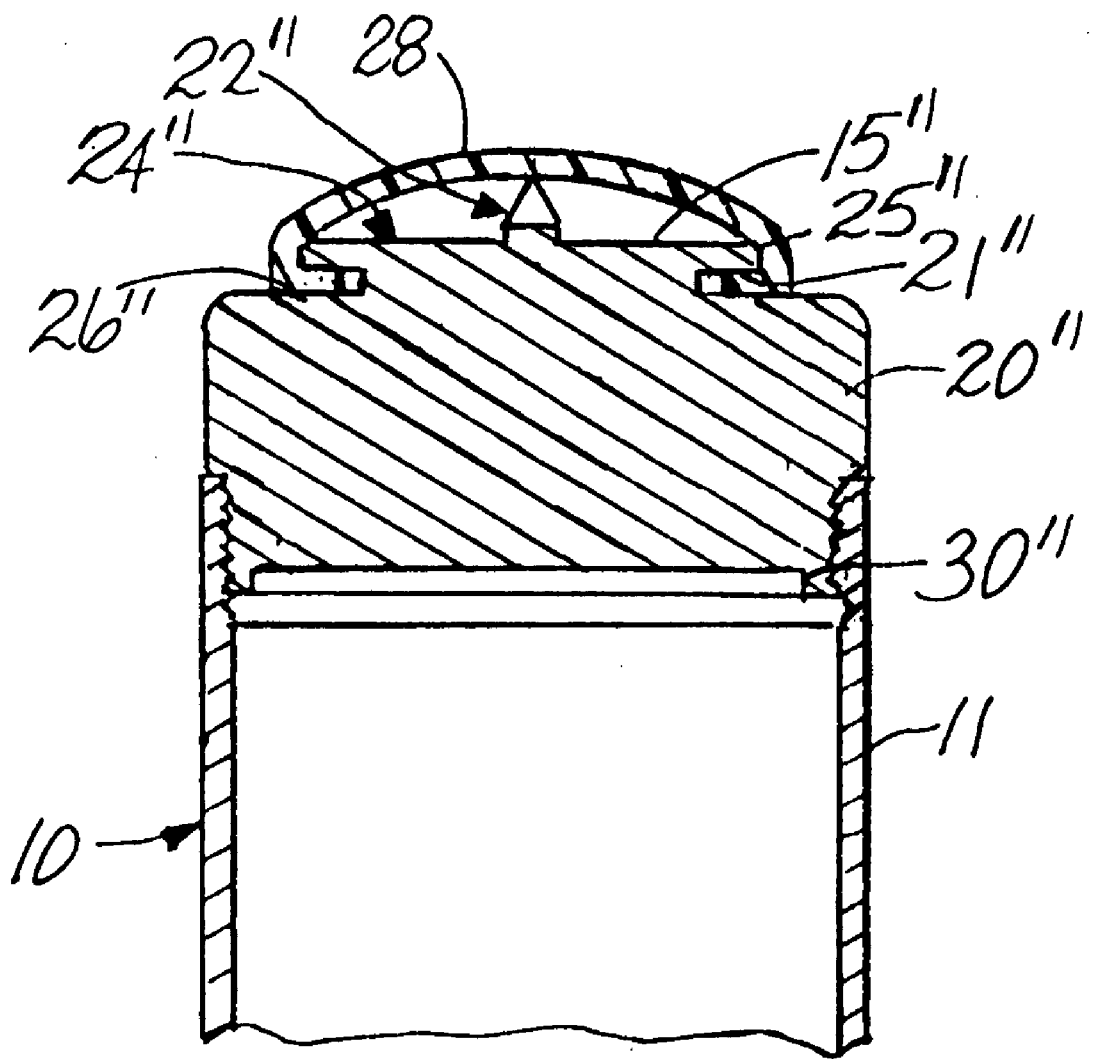
FIG. 6 is a cross-sectional side view of the second end of a third alternate embodiment of the flashlight of the present invention.

In yet another embodiment, FIG. 6 discloses a side view of a safety point base 24" with a central peg 22", each of which are integral with an end cap 20". This embodiment is substantially the same as the above embodiments, except the modified end cap is one integral piece. The end cap comprises the safety point base which has an enlarged end plate 25", an intermediate support cylinder 21", and threads 30" for screwing the end cap onto the second end of the flashlight. The enlarged end plate has a face surface 15" and a lip 26". The end cap with the integral safety point base and central peg can be made out of the same materials as above. However, this embodiment would be expensive to use because the entire piece would need to be replaced each time the tip wore out. Making the entire piece of an inexpensive material would save cost per unit but the tip would likely wear out more quickly and the entire piece would have to be replaced more often. Making the entire piece out of a more expensive and likely more durable material, such as tungsten carbide would greatly increase the per unit manufacturing and material costs. Moreover, even tungsten carbide will eventually wear causing the need to replace the whole end cap, rather than just the central peg. The benefit of this embodiment is that because the central peg is integral with the end cap, it will not inadvertently dislodge from the safety point base. A protective cap 28 may be used. However, the cap will not be able to be pressed into place, and will be bonded to the lip 26" or will be held in place by the elastic force of the cap edges.

While various embodiments of this invention have been shown and described, it would be apparent to those skilled in the art that many more modifications are possible without departing from the inventive concept herein. Therefore, those skilled in the art should realize that variables may be adjusted as necessary to provide a desired effect. It is therefore to be understood that within the scope of the appended claims, this invention may be practiced otherwise than as specifically described.

What is claimed is:

1. A safety point for a flashlight comprising a safety point base having:
   an intermediate support cylinder having a central bore;
   an enlarged end plate adjacent the intermediate support cylinder and having a central bore corresponding with the central bore of the intermediate support cylinder;
   a central cylinder having a central bore corresponding with the central bores of the intermediate support cylinder and the enlarged end plate, wherein the intermediate support cylinder is positioned in between the central cylinder and the enlarged end plate; and
   a central peg having a cylindrical portion received in the corresponding central bores and a safety point tip portion which protrudes from the enlarged end plate.

2. The safety point of claim 1 wherein the safety point tip portion is cone shaped.

3. The safety point of claim 1 further comprising a protective cover.

4. The safety point of claim 3 wherein the protective cover is a rubber cap, wherein the enlarged end plate has an outer diameter that is greater than that of the intermediate support cylinder and a lip adapted to accommodate edges of the rubber cap.

5. The safety point of claim 3 wherein the protective cover is a protective rubber doughnut.

6. The safety point of claim 1 wherein the central peg is made of tungsten carbide.

7. The safety point of claim 1 wherein the intermediate support cylinder is integral with the enlarged end plate, and the central cylinder.

8. A flashlight with a safety point comprising:
a handle having a first end and a second end;
a lamp coupled to the first end of the handle;
an end cap coupled to the second end of the handle; and
a safety point base coupled with the end cap,
wherein the safety point base has:
- an intermediate support cylinder having a central bore;
- an enlarged end plate adjacent the intermediate support cylinder and having a central bore corresponding with the central bore of the intermediate support cylinder;
- a central cylinder having a central bore corresponding with the central bores of the intermediate support cylinder and the enlarged end plate, wherein the intermediate support cylinder is positioned in between the central cylinder and the enlarged end plate; and
- a central peg having a cylindrical portion received in the corresponding central bores and a safety point tip portion which protrudes from the enlarged end plate.

9. The safety point of claim 8 wherein the safety point tip portion is cone shaped.

10. The safety point of claim 8 further comprising a protective cover.

11. The safety point of claim 10 wherein the protective cover is a rubber cap, wherein the enlarged end plate has a lip adapted to accommodate edges of the rubber cap.

12. The safety point of claim 10 wherein the protective cover is a protective rubber doughnut.

13. The flashlight with a safety point of claim 11 wherein the rubber cap comprises a slit from which the tip portion protrudes during use.

14. The flashlight with a safety point of claim 8 wherein the safety point base is integral with the end cap.

15. The flashlight with a safety point of claim 14 wherein the central peg is integral with the intermediate support cylinder, the enlarged end plate, and the central cylinder of the safety point base.

16. The flashlight with a safety point of claim 8 wherein the central peg is integral with the intermediate support cylinder, the enlarged end plate, and the central cylinder of the safety point base.

17. A method of producing a flashlight with a safety point having a safety point base, the safety point base having an intermediate support cylinder having a central bore; an enlarged end plate adjacent the intermediate support cylinder and having a central bore corresponding with the central bore of the intermediate support cylinder; a central cylinder having a central bore corresponding with the central bores of the intermediate support cylinder and the enlarged end plate, wherein the intermediate support cylinder is positioned in between the central cylinder and the enlarged end plate; and a central peg having a cylindrical portion received in the corresponding central bores and a safety point tip portion which protrudes from the enlarged end plate, the method comprising:
- making a first hole in an end cap of a flashlight to produce an opening for receiving the safety point base;
- making a second hole in the safety point base to produce the corresponding central bores of the enlarged end plate, the intermediate support cylinder, and the central cylinder;
- inserting the central peg into the corresponding central bores; and
- inserting the safety point base into the opening of the end cap.

18. The method of claim 17 wherein the central peg has a smaller diameter than the central bore,
wherein the central peg is inserted by using an arbor press to press fit the central peg into the central bore, and
wherein the safety point base is then pressed into the end cap.

19. The method of claim 17 wherein the central peg is glued to the central bore with epoxy.

20. The method of claim 17 wherein the central peg is welded into the central bore.

21. The method of claim 17 wherein the hole in the end cap is made by drilling with a drill bore.

22. The method of claim 17 wherein a CNC lathe is used in to place the central peg into the central bores.

23. An end cap for a flashlight comprising:
- a base with an inner surface and outer surface, the inner surface being capable of coupling to an end of the flashlight;
- a central peg having a main portion for attachment to the base and a pointed tip that protrudes from the outer surface of the base; and
- a protective rubber dome cap placed over the pointed tip of the central peg and attached to the base.

24. The end cap of claim 23 wherein the central peg is removably attached to the base for replacement of the central peg.

25. The end cap of claim 23 wherein the protective rubber dome cap is removably attached to the base for replacement of the protective rubber dome cap.

26. The end cap of claim 23 wherein the safety point tip portion is a cone.

27. The end cap of claim 23 wherein a length of the peg is approximately ½ inch.

28. The end cap of claim 23 wherein the protective rubber dome cap has a slit from which the pointed tip protrudes when the pointed tip is used.

* * * * *